US008961808B2

(12) United States Patent
Robin

(10) Patent No.: US 8,961,808 B2
(45) Date of Patent: Feb. 24, 2015

(54) AZEOTROPE-LIKE COMPOSITIONS OF E-1-CHLORO-2,3,3,3-TETRAFLUOROPROPENE AND USES THEREOF

(71) Applicant: E. I. du Pont de Nemours and Company, Wilmington, DE (US)

(72) Inventor: Mark L Robin, Middletown, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 14/352,716

(22) PCT Filed: Oct. 19, 2012

(86) PCT No.: PCT/US2012/060953
§ 371 (c)(1),
(2) Date: Apr. 18, 2014

(87) PCT Pub. No.: WO2013/059550
PCT Pub. Date: Apr. 25, 2013

(65) Prior Publication Data
US 2014/0305667 A1    Oct. 16, 2014

Related U.S. Application Data

(60) Provisional application No. 61/549,265, filed on Oct. 20, 2011, provisional application No. 61/549,267, filed on Oct. 20, 2011.

(51) Int. Cl.
*A62D 1/00*    (2006.01)
*C09K 5/00*    (2006.01)
(Continued)

(52) U.S. Cl.
CPC ............ *A62D 1/0092* (2013.01); *A62D 1/0057* (2013.01); *C09K 3/30* (2013.01);
(Continued)

(58) Field of Classification Search
None
See application file for complete search history.

(56) References Cited

U.S. PATENT DOCUMENTS

| 5,463,150 | A | 10/1995 | Lui et al. | |
|---|---|---|---|---|
| 2007/0096053 | A1* | 5/2007 | Nair et al. | 252/67 |

(Continued)

FOREIGN PATENT DOCUMENTS

| WO | 2008054778 A2 | 5/2008 |
|---|---|---|
| WO | 2008057513 A1 | 5/2008 |
| WO | 2010141527 A1 | 12/2010 |

OTHER PUBLICATIONS

Doherty and M.F. Malone, Conceptual Design of Distillation Systems, McGraw-Hill, New York, 2001, 185-186, 351-359.

(Continued)

*Primary Examiner* — Joseph D Anthony

(57) ABSTRACT

Azeotrope-like compositions are disclosed. The azeotrope-like compositions are mixtures of E-1-chloro-2,3,3,3-tetrafluoropropene with E-1,1,1,4,4,4-hexafluoro-2-butene or E-1,1,1,4,4,5,5,5-octafluoro-2-pentene. Also disclosed is a process of preparing a thermoplastic or thermoset foam by using such azeotrope-like compositions as blowing agents. Also disclosed is a process of producing refrigeration by using such azeotrope-like compositions. Also disclosed is a process of using such azeotrope-like compositions as solvents. Also disclosed is a process of producing an aerosol product by using such azeotrope-like compositions. Also disclosed is a process of using such azeotrope-like compositions as heat transfer media. Also disclosed is a process of extinguishing or suppressing a fire by using such azeotrope-like compositions. Also disclosed is a process of using such azeotrope-like compositions as dielectrics.

8 Claims, 2 Drawing Sheets

(51) Int. Cl.
*C09K 5/04* (2006.01)
*C23G 5/028* (2006.01)
*A62C 2/00* (2006.01)
*A62C 3/00* (2006.01)
*C09K 3/30* (2006.01)
*C08J 9/14* (2006.01)
*C11D 7/50* (2006.01)
*C09K 3/00* (2006.01)
*H01B 3/56* (2006.01)

(52) U.S. Cl.
CPC ........... *C08J 9/144* (2013.01); *C08J 2203/162* (2013.01); *C08J 2203/182* (2013.01); *C09K 5/045* (2013.01); *C09K 2205/122* (2013.01); *C09K 2205/32* (2013.01); *C11D 7/5054* (2013.01); *C09K 3/00* (2013.01); *C09K 5/00* (2013.01); *H01B 3/56* (2013.01); *Y10S 62/918* (2013.01)
USPC .................. 252/2; 252/364; 252/571; 252/67; 252/78.1; 169/46; 169/47; 510/408; 510/412; 521/98; 62/119; 62/918

(56) References Cited

U.S. PATENT DOCUMENTS

| | | | |
|---|---|---|---|
| 2010/0076231 | A1 | 3/2010 | Nappa et al. |
| 2010/0163776 | A1 | 7/2010 | Robin |
| 2011/0152392 | A1* | 6/2011 | Van Der Puy et al. .......... 521/87 |
| 2011/0315915 | A1* | 12/2011 | Abbas et al. .................... 252/67 |
| 2012/0248371 | A1* | 10/2012 | Ross et al. ................ 252/182.15 |
| 2013/0292599 | A1* | 11/2013 | Robin ................................ 252/2 |
| 2014/0305667 | A1* | 10/2014 | Robin ............................. 169/46 |

OTHER PUBLICATIONS

Null, Phase Equilibrium in Process Design, Wiley-Interscience Publisher, 1970, pp. 124 to 126.
Walas, Phase Equilibria in Chemical Engineering, published by Butterworth Publishers, 1985, pp. 165 to 244.

* cited by examiner

AZEOTROPE-LIKE COMPOSITIONS OF E-1-CHLORO-2,3,3,3-TETRAFLUOROPROPENE AND USES THEREOF

This application claims priority of U.S. Patent Application Nos. 61/549265 and 61/549267 filed Oct. 20, 2011.

BACKGROUND OF THE INVENTION

1. Field of the Disclosure

The present disclosure relates to azeotrope-like compositions of E-1-chloro-2,3,3,3-tetrafluoropropene.

2. Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs). Certain hydrofluoroolefins, such as 1,1,1,4,4,4-hexafluoro-2-butene ($CF_3CH=CHCF_3$, FC-1336mzz, HFO-1336mzz) and 1,1,1,4,4,5,5,5-octafluoro-2-pentene ($CF_3CH=CHCF_2CF_3$, HFO-1438mzz), are believed to meet both goals.

SUMMARY OF THE INVENTION

This application includes two different types of azeotrope-like mixtures.

This disclosure provides a composition consisting essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

DETAILED DESCRIPTION OF THE INVENTION

Figure 1:
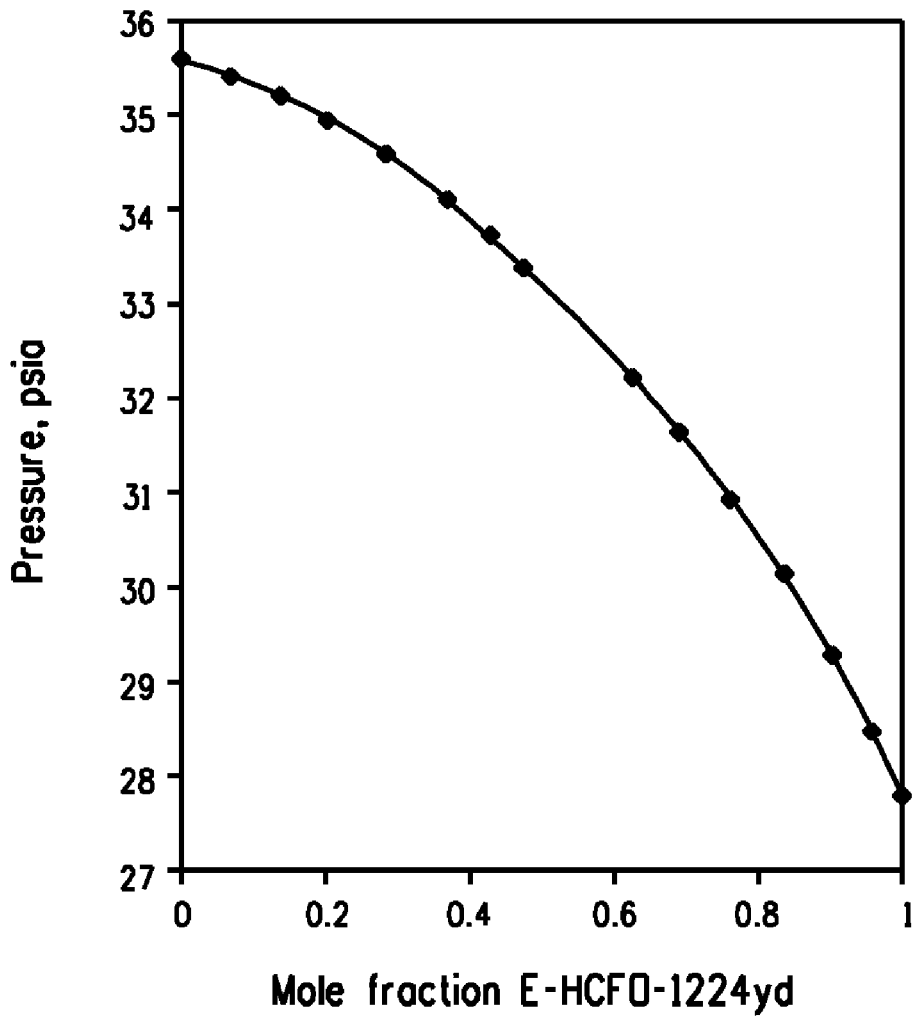
FIG. 1 is a graphical representation of azeotrope-like compositions of E-HFO-1336mzz and E-HCFO-1224yd at a temperature of about 31.7° C.

In many applications, the use of a pure single component or an azeotropic or azeotrope-like mixture is desirable. For example, when a blowing agent composition (also known as foam expansion agents or foam expansion compositions) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing E-1-chloro-2,3,3,3-tetrafluoropropene (E-$CF_3CF=CHCl$, E-HCFO-1224yd) and E-1,1,1,4,4,4-hexafluoro-2-butene (E-$CF_3CH=CHCF_3$, E-FC-1336mzz, E-HFO-1336mzz), or E-HCFO-1224yd and E-1,1,1,4,4,5,5,5-octafluoro-2-pentene (E-$CF_3CH=CHCF_2CF_3$, E-HFO-1438mzz).

Before addressing details of embodiments described below, some terms are defined or clarified.

HFO-1336mzz may exist as one of two configurational isomers, E or Z. HFO-1336mzz as used herein refers to the isomers, Z-HFO-1336mzz or E-HFO-1336mzz, as well as any combinations or mixtures of such isomers.

HFO-1438mzz may exist as one of two configurational isomers, E or Z. HFO-1438mzz as used herein refers to the isomers, Z-HFO-1438mzz or E-HFO-1438mzz, as well as any combinations or mixtures of such isomers.

1-chloro-2,3,3,3-tetrafluoropropene HCFO-1224yd) may exist as one of two configurational isomers, E or Z. HCFO-1224yd as used herein refers to the isomers, Z-HCFO-1224yd or E-HCFO-1224yd, as well as any combinations or mixtures of such isomers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs, In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

E-HFO-1336mzz is a known compound, and can be made through the reaction of 1,2-dichloro-1,1,4,4,4-pentafluorobutane with dried KF in distilled tetramethylene sulphone, such as disclosed in U.S. Pat. No. 5,463,150.

E-HFO-1438mzz is a known compound, and can be made through the reaction between $CF_{3z}CH$=$CHF$ and $CF_2$=$CF_2$ in the presence of a Lewis acid catalyst (e.g., $SbF_5$), such as disclosed in PCT Patent Application Publication WO 2008/057513 A1.

E-HCFO-1224yd is a known compound, and can be made by dehydrofluorinating $CH_2ClCF_2CF_3$ (HCFC-235cb) in the presence of a dehydrofluorination catalyst, such as disclosed in U.S. Patent Publication No. 2010-0076231.

This application includes azeotrope-like compositions comprising E-HCFO-1224yd.

In some embodiments of this invention, the composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

In some embodiments of this invention, the composition consists essentially of (a) E-HCFO-1224yd and (b) E-HFO-1336mzz; wherein the E-HFO-1336mzz is present in an effective amount to form an azeotrope-like mixture with E-HCFO-1224yd.

In some embodiments of this invention, the composition consists essentially of (a) E-HCFO-1224yd and (b) E-HFO-1438mzz; wherein the E-HFO-1438mzz is present in an effective amount to form an azeotrope-like mixture with E-HCFO-1224yd.

By effective amount is meant an amount of E-HFO-1336mzz or E-HFO-1438mzz, which, when combined with E-HCFO-1224yd, results in the formation of an azeotrope-like mixture. This definition includes the amounts of each component, which amounts may vary depending on the pressure applied to the composition so long as the azeotrope-like compositions continue to exist at the different pressures, but with possible different boiling points. Therefore, effective amount includes the amounts, such as may be expressed in weight or mole percentages, of each component of the compositions of the instant invention which form azeotrope-like compositions at temperatures or pressures other than as described herein.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359), Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. The vapor-liquid equilibrium (VLE), and hence relative volatility, can be determined either isothermally or isobarically. The isothermal method requires measurement of the total pressure of mixtures of known composition at constant temperature. In this procedure, the total absolute pressure in a cell of known volume is measured at a constant temperature for various compositions of the two compounds. The isobaric method requires measurement of the temperature of mixtures of known composition at constant pressure. In this procedure, the temperature in a cell of known volume is measured at a constant pressure for various compositions of the two compounds. Use of the PTx Method is described in detail in "Phase Equilibrium in Process Design", Wiley-Interscience Publisher, 1970, written by Harold R. Null, on pages 124 to 126.

These measurements can be converted into equilibrium vapor and liquid compositions in the PTx cell by using an activity coefficient equation model, such as the Non-Random, Two-Liquid (NRTL) equation, to represent liquid phase non-idealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244, Without wishing to be bound by any theory or explanation, it is believed that the NRTL equation, together with the PTx cell data, can sufficiently predict the relative volatilities of the E-HCFO-1224yd/E-HFO-1336mzz compositions and the E-HCFO-1224yd/E-HFO-1438mzz compositions of the present invention and can therefore predict the behavior of these mixtures in multi-stage separation equipment such as distillation columns.

It was found through experiments that E-HCFO-1224yd and E-HFO-1336mzz form azeotrope-like compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

The pressures measured versus the compositions in the PTx cell for E-HFO-1336mzz/E-HCFO-1224yd mixture are shown in FIG. 1, which graphically illustrates the formation of azeotrope-like compositions of E-HFO-1336mzz and E-HCFO-1224yd at 31.7° C., as indicated by mixtures of about 1 to 99 mole % E-HFO-1336mzz and about 99 to 1 mole % E-HCFO-1224yd at pressures ranging from about 28 psia to about 36 psia. According to calculation, azeotrope-like compositions consisting essentially of 1-99 mole % E-HFO-1336mzz and 99-1 mole % E-HCFO-1224yd are formed at temperatures ranging from about −40° C. to about 120° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 1. Some more embodiments of azeotrope-like compositions are listed in Table 2.

TABLE 1

Azeotrope-like compositions

| COMPONENTS | T (° C.) | Mole Percentage Range |
|---|---|---|
| E-HFO-1336mzz/E-HCFO-1224yd | −40 | 1-99/99-1 |
| E-HFO-1336mzz/E-HCFO-1224yd | −20 | 1-99/99-1 |
| E-HFO-1336mzz/E-HCFO-1224yd | 0 | 1-99/99-1 |
| E-HFO-1336mzz/E-HCFO-1224yd | 20 | 1-99/99-1 |
| E-HFO-1336mzz/E-HCFO-1224yd | 40 | 1-99/99-1 |
| E-HFO-1336mzz/E-HCFO-1224yd | 60 | 1-99/99-1 |
| E-HFO-1336mzz/E-HCFO-1224yd | 80 | 1-99/99-1 |
| E-HFO-1336mzz/E-HCFO-1224yd | 100 | 1-99/99-1 |
| E-HFO-1336mzz/E-HCFO-1224yd | 120 | 1-99/99-1 |

TABLE 2

Azeotrope-like compositions

| COMPONENTS | T (° C.) | Mole Percentage Range |
|---|---|---|
| E-HFO-1336mzz/E-HCFO-1224yd | −40 | 5-95/95-5 |
| E-HFO-1336mzz/E-HCFO-1224yd | −20 | 5-95/95-5 |
| E-HFO-1336mzz/E-HCFO-1224yd | 0 | 5-95/95-5 |
| E-HFO-1336mzz/E-HCFO-1224yd | 20 | 5-95/95-5 |
| E-HFO-1336mzz/E-HCFO-1224yd | 40 | 5-95/95-5 |
| E-HFO-1336mzz/E-HCFO-1224yd | 60 | 5-95/95-5 |
| E-HFO-1336mzz/E-HCFO-1224yd | 80 | 5-95/95-5 |
| E-HFO-1336mzz/E-HCFO-1224yd | 100 | 5-95/95-5 |
| E-HFO-1336mzz/E-HCFO-1224yd | 120 | 5-95/95-5 |

It was also found through experiments that E-HCFO-1224yd and E HFO-1438mzz form azeotrope-like compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

Figure 2:
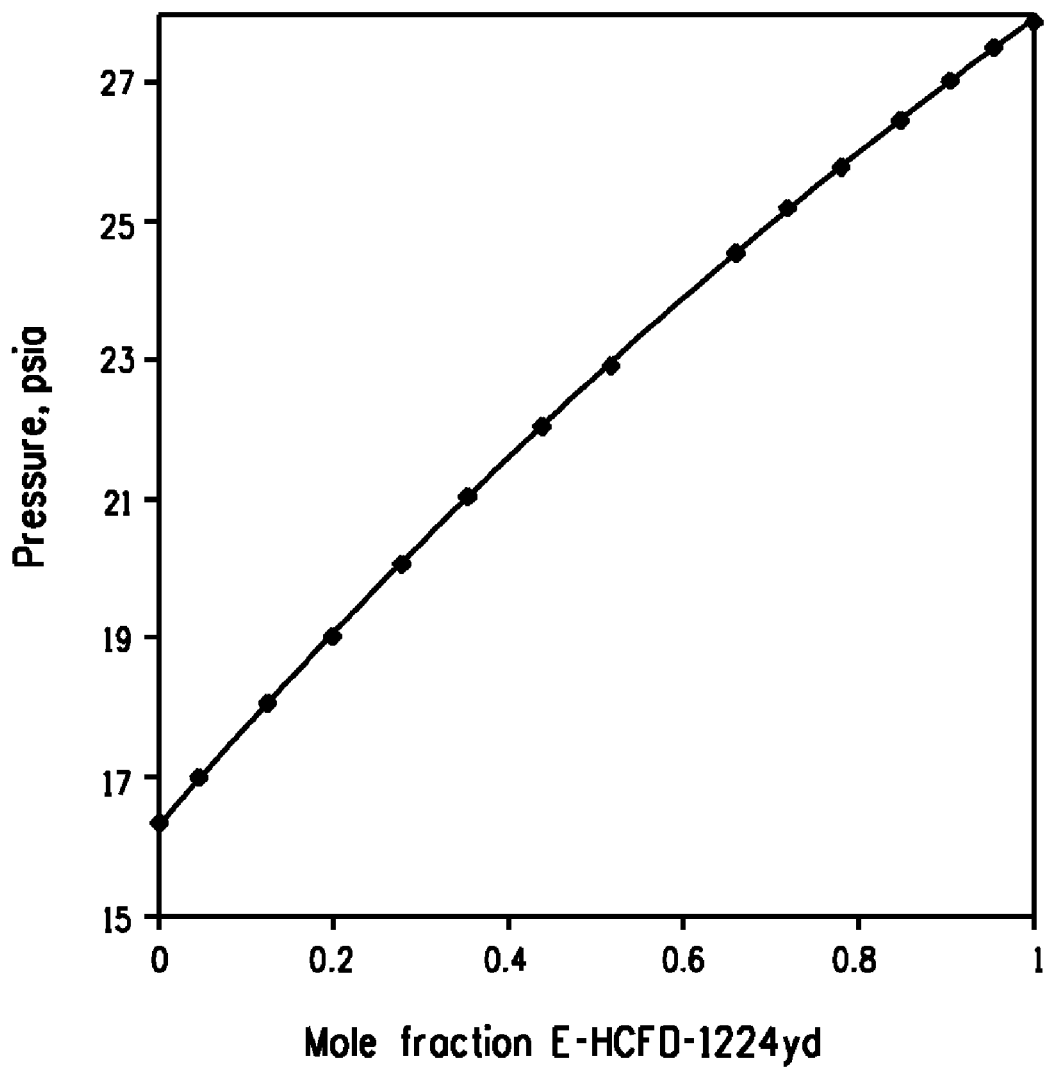
FIG. 2 is a graphical representation of azeotrope-like compositions of E-HFO-1438mzz and E-HCFO-1224yd at a temperature of about 31.8° C.

The pressures measured versus the compositions in the PTx cell for E-HFO-1438mzz/E-HCFO-1224yd mixture are shown in FIG. 2, which graphically illustrates the formation of azeotrope-like compositions of E-HFO-1438mzz and E-HCFO-1224yd at 31.8 as indicated by mixtures of about 1 to 33 mole % E-HFO-1438mzz and about 99 to 67 mole % E-HCFO-1224yd at pressures ranging from about 25 psia to about 28 psia, and mixtures of about 84 to 99 mole % E-HFO-1438mzz and about 16 to 1 mole % E-HCFO-1224yd at pressures ranging from about 16 psia to about 19 psia. According to calculation, azeotrope-like compositions consisting essentially of 1-99 mole % E-HFO-1438mzz and 99-1 mole % E-HCFO-1224yd are formed at temperatures ranging from about −40° C. to about 140° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 3. Some more embodiments of azeotrope-like compositions are listed in Table 4.

TABLE 3

Azeotrope-like compositions

| COMPONENTS | T (° C.) | Mole Percentage Range |
|---|---|---|
| E-HFO-1438mzz/E-HCFO-1224yd | −40 | 1-11/99-89 and 96-99/4-1 |
| E-HFO-1438mzz/E-HCFO-1224yd | −20 | 1-14/99-86 and 94-99/6-1 |
| E-HFO-1438mzz/E-HCFO-1224yd | 0 | 1-19/99-81 and 92-99/8-1 |
| E-HFO-1438mzz/E-HCFO-1224yd | 20 | 1-26/99-74 and 88-99/12-1 |
| E-HFO-1438mzz/E-HCFO-1224yd | 40 | 1-38/99-62 and 80-99/20-1 |
| E-HFO-1438mzz/E-HCFO-1224yd | 60 | 1-99/99-1 |
| E-HFO-1438mzz/E-HCFO-1224yd | 80 | 1-99/99-1 |
| E-HFO-1438mzz/E-HCFO-1224yd | 100 | 1-99/99-1 |
| E-HFO-1438mzz/E-HCFO-1224yd | 120 | 1-99/99-1 |
| E-HFO-1438mzz/E-HCFO-1224yd | 140 | 1-99/99-1 |

TABLE 4

Azeotrope-like compositions

| COMPONENTS | T (° C.) | Mole Percentage Range |
|---|---|---|
| E-HFO-1438mzz/E-HCFO-1224yd | −40 | 5-11/95-89 and 96-99/4-1 |
| E-HFO-1438mzz/E-HCFO-1224yd | −20 | 5-14/95-86 and 94-95/6-5 |
| E-HFO-1438mzz/E-HCFO-1224yd | 0 | 5-19/95-81 and 92-95/8-5 |
| E-HFO-1438mzz/E-HCFO-1224yd | 20 | 5-26/95-74 and 88-95/12-5 |
| E-HFO-1438mzz/E-HCFO-1224yd | 40 | 5-38/95-62 and 80-95/20-5 |
| E-HFO-1438mzz/E-HCFO-1224yd | 60 | 5-95/95-5 |
| E-HFO-1438mzz/E-HCFO-1224yd | 80 | 5-95/95-5 |
| E-HFO-1438mzz/E-HCFO-1224yd | 100 | 5-95/95-5 |
| E-HFO-1438mzz/E-HCFO-1224yd | 120 | 5-95/95-5 |
| E-HFO-1438mzz/E-HCFO-1224yd | 140 | 5-95/95-5 |

The azeotrope-like compositions of the present invention can be prepared by any convenient method including mixing or combining the desired amounts. In one embodiment of this invention, an azeotrope-like composition can be prepared by weighing the desired component amounts and thereafter combining them in an appropriate container.

The azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotrope-like composition as a blowing agent, wherein said azeotrope-like composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

Another embodiment of this invention provides a process for producing refrigeration, The process comprises condensing an azeotrope-like composition and thereafter evaporating said azeotrope-like composition in the vicinity of the body to be cooled, wherein said azeotrope-like composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

Another embodiment of this invention provides a process using an azeotrope-like composition as a solvent, wherein said azeotrope-like composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

Another embodiment of this invention provides a process for producing an aerosol product. The process comprises using an azeotrope-like composition as a propellant, wherein said azeotrope-like composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

Another embodiment of this invention provides a process using an azeotrope-like composition as a heat transfer media, wherein said azeotrope-like composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd. Another embodiment of this invention provides a process for extinguishing or suppressing a fire. The process comprises using an azeotrope-like composition as a fire extinguishing or suppression agent, wherein said azeotrope-like composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

Another embodiment of this invention provides a process using an azeotrope-like composition as dielectrics, wherein said azeotrope-like composition consists essentially of (a) E-HCFO-1224yd and (b) a component selected from the group consisting of E-HFO-1336mzz and E-HFO-1438mzz; wherein said component is present in an effective amount to form an azeotrope-like combination with the E-HCFO-1224yd.

The invention claimed is:

1. A composition consisting essentially of:
   (a) E-1-chloro-2,3,3,3-tetrafluoropropene; and
   (b) a component selected from the group consisting of E-1,1,1,4,4,4-hexafluoro-2-butene and E-1,1,1,4,4,5,5,5-octafluoro-2-pentene; wherein said component is present in an effective amount to form an azeotrope-like combination with the E-1-chloro-2,3,3,3-tetrafluoropropene.

2. A process for preparing a thermoplastic or thermoset foam comprising using the azeotrope-like composition of claim 1 as a blowing agent.

3. A process for producing refrigeration comprising condensing the azeotrope-like composition of claim 1 and thereafter evaporating said azeotrope-like composition in the vicinity of the body to be cooled.

4. A process comprising using the azeotrope-like composition of claim 1 as a solvent.

5. A process for producing an aerosol product comprising using the azeotrope-like composition of claim 1 as a propellant.

6. A process comprising using the azeotrope-like composition of claim 1 as a heat transfer media.

7. A process for extinguishing or suppressing a fire comprising using the azeotrope-like composition of claim 1 as a fire extinguishing or suppression agent.

8. A process comprising using the azeotrope-like composition of claim 1 as dielectrics.

* * * * *